(12) United States Patent
Schaupert et al.

(10) Patent No.: US 9,194,663 B2
(45) Date of Patent: Nov. 24, 2015

(54) TRANSPARENT GLASS/POLYMER COMPOSITE

(75) Inventors: Kurt Schaupert, Hofheim (DE); Thilo Hinrich Zachau, Bensheim (DE); Frieder Kropfgans, Jena (DE)

(73) Assignee: SCHOTT AG, Mainz (DE)

( * ) Notice: Subject to any disclaimer, the term of this patent is extended or adjusted under 35 U.S.C. 154(b) by 337 days.

(21) Appl. No.: 13/638,883

(22) PCT Filed: Mar. 30, 2011

(86) PCT No.: PCT/EP2011/001592
§ 371 (c)(1),
(2), (4) Date: Dec. 11, 2012

(87) PCT Pub. No.: WO2011/120680
PCT Pub. Date: Oct. 6, 2011

(65) Prior Publication Data
US 2013/0199360 A1    Aug. 8, 2013

(30) Foreign Application Priority Data

Apr. 1, 2010    (DE) .......................... 10 2010 013 641

(51) Int. Cl.
*F41H 5/00*    (2006.01)
*F41H 5/04*    (2006.01)
*B32B 17/10*    (2006.01)

(52) U.S. Cl.
CPC ........ *F41H 5/0407* (2013.01); *B32B 17/10045* (2013.01); *B32B 17/1077* (2013.01); *B32B 17/10137* (2013.01); *B32B 17/10761* (2013.01); *B32B 2369/00* (2013.01)

(58) Field of Classification Search
USPC .......... 89/36.01, 36.02, 36.07, 36, 11; 109/10
See application file for complete search history.

(56) References Cited

U.S. PATENT DOCUMENTS 3,625,792 A * 12/1971 Shaffer ......................... 156/214
2007/0060465 A1    3/2007 Varshneya

FOREIGN PATENT DOCUMENTS

| DE | 2039452 | 2/1972 |
|---|---|---|
| DE | 2039452 A1 | 2/1972 |
| DE | 9310959 U1 | 9/1993 |
| DE | 4236233 A1 | 4/1994 |
| DE | 69227344 T2 | 6/1999 |

(Continued)

OTHER PUBLICATIONS

English Translation of the Written Opinion of the International Search Authority dated Oct. 1, 2012 corresponding to International Patent Application No. PCT/EP2011/001592.
International Preliminary Report on Patentability dated Oct. 11, 2012 corresponding to International Patent Application No. PCT/EP2011/001592.

(Continued)

*Primary Examiner* — J. Woodrow Eldred
(74) *Attorney, Agent, or Firm* — Ohlandt, Greeley, Ruggiero & Perle, LLP

(57) ABSTRACT

A transparent device for protection from an action of shock, projectiles, fragments or shock waves is provided. The device is a laminate having brittle-fracture, transparent materials that are joined together by way of transparent intermediate layers of organic polymers. The laminate is closed on the protective side facing away from the side of action by a fragment-protective layer that is formed as a transparent polymer layer in a thickness of 0.5 mm to 12 mm. The laminate has facing the side of action a chemically prestressed, brittle-fracture panel that is at a distance of 3 mm to 20 mm from the side of action.

13 Claims, 1 Drawing Sheet

(56) References Cited

FOREIGN PATENT DOCUMENTS

Figure 1:
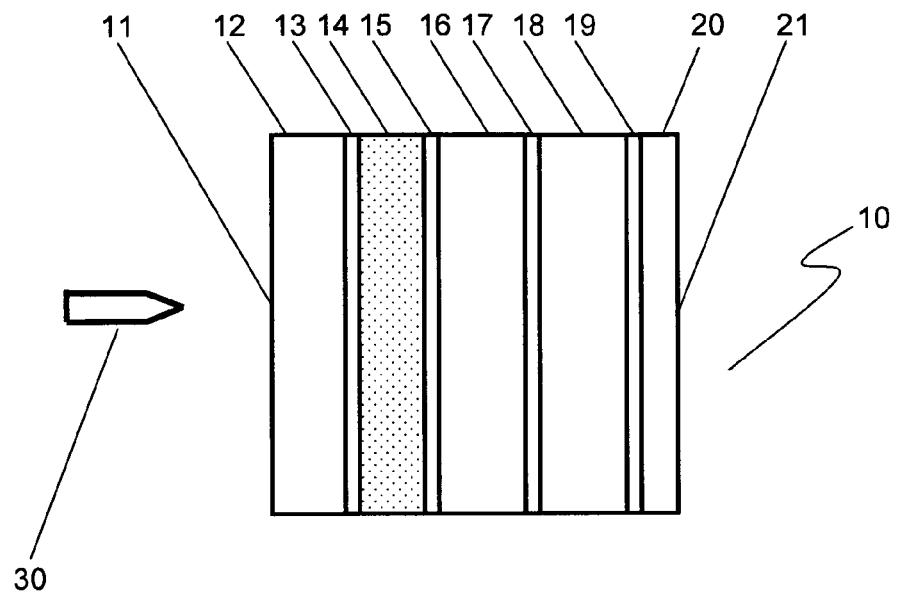

| | | |
|---|---|---|
| DE | 20023947 | 11/2007 |
| DE | 20023947 U1 | 11/2007 |
| DE | 102008043718 A1 | 5/2010 |
| EP | 0884289 A1 | 12/1998 |
| JP | 54100415 A | 12/1977 |
| WO | 03/068501 | 8/2003 |

OTHER PUBLICATIONS

International Search Report dated Jul. 5, 2011 corresponding to International Patent Application No. PCT/EP2011/001592.

English Translation of Office Action dated Nov. 19, 2010 corresponding to German Patent Application No. 10 2010 013 641.7-45, 3 pages.

English Translation of Office Action dated Feb. 18, 2013 corresponding to German Patent Application No. 10 2010 013 641.7, 2 pages.

* cited by examiner

TRANSPARENT GLASS/POLYMER COMPOSITE

The invention relates to a transparent device for protection from the action of shock and/or projectiles, and/or fragments, and/or shock waves, the device being designed as a laminate of at least 4 brittle-fracture, transparent panels that are joined together by way of transparent intermediate layers of organic polymers, the laminate having a total thickness of at least 60 mm, and on the protective side not facing the side of action, the laminate being closed with a layer that protects against fragments having a thickness of 0.5 to 12 mm, and formed as a transparent polymer layer.

Transparent protection from ballistic effects, for example, from ammunition from firearms and fragments, is produced from glass plates or panels laminated to each other by plastic films or layers of casting resins. Soda-lime glass is used as a glass material and also an iron-poor soda-lime glass is used in the case of thicker composites since transmission is necessary. The protective effect of the composites is defined and classified according to standardized methods, such as are presented, for example, in the specifications of STANAG 4569 and DIN 1063 or VPAM APR 2006. For example, in STANAG 4569, for protection level 3, a testing with hard-core ammunition of caliber 7.62×51 having a tungsten carbide core as well as of caliber 7.62×54R with a steel core is provided. In addition, the effect of shrapnel is carried out by testing with 20 mm "fragment-simulating projectiles" (FSP). The composite must withstand this load in such a way that the projectiles do not pass through nor do particles split off from the protective device, which might cause a wounding or essential damage to the persons or objects being protected behind the protective device.

In addition to the sufficient protective effect, a weight per unit area of the composites that is as low as possible is a decisive factor for use in vehicles, since this enters into the total weight of the vehicle and thus any improvement in weight makes it possible to increase the payload of the vehicle. In general, transparent protective devices are disposed in the upper region of the vehicle, thus above its center of gravity. This leads to the circumstance that a low weight of the transparent protection also can improve driving stability on poor roads and around corners or curves.

Casting resins based on epoxy resins and films of ethylene vinyl acetate (EVA), polyvinyl butyral (PVB) or thermoplastic polyurethanes (TPUs) are used as polymer layers.

According to the prior art, on the side facing away from the bullet, the laminate is sealed with a crack-resistant polymer layer having a thickness in the range of 0.5 mm to 12 mm thickness. This serves for the purpose of collecting fragments forming in the laminate under dynamic load, and thus these fragments do not wound the occupants of the vehicle.

A reduction in the weight per unit area of the transparent protection can be achieved by partial or complete replacement of the glass plates of soda-lime glass by other brittle-fracture materials such as aluminosilicate or borosilicate glass, glass ceramics, transparent ceramics or crystalline materials, such as sapphire. The high-price, transparent ceramics and crystalline materials that are highly effective for protection can hardly be used, of course, for reasons of cost.

Described in DE 10 2008 043 718 A1 is an armored glass comprising at least one outwardly oriented transparent glass-ceramic panel (a) with a thickness in the range of 3-20 mm, optionally at least one panel (b) from the group: borosilicate glass, soda-lime glass and alumosilicate glass having a thickness in the range of 3-20 mm, which can be chemically prestressed, and at least one transparent polymer panel (c), in particular, a polycarbonate panel, oriented toward the object to be protected, the thickness of panel (c) lying in the range between 3 and 15 mm; the individual panels are joined by transparent intermediate layers of casting resin or polymer films.

Known from DE 692 27 344 T2 is a transparent safety glazing for aircraft, comprising a chemically prestressed glass panel, which is oriented toward the inside of the aircraft cabin, and which is provided on its side pointing toward the cabin with a fragment protective layer having a thickness of up to 0.6 mm, a 4-mm thick, outer glass panel and a PVB intermediate layer disposed between outer and inner glass panels comprising 7 layers and having a total thickness of 4.02 mm (2×0.76 mm+5×0.5 mm). The chemically prestressed panel is thus disposed at a distance of 8.02 mm from the side of action.

The bullet-stopping transparent glazing described in DE 93 10 959 U1 has a fragment-protective layer made of polycarbonate of a thickness of 3 mm on its side pointing toward the passenger compartment; a chemically hardened panel is disposed on the side of action at a distance of up to 5.5 mm.

A gas-filled region with a dimension between 3 and 10 mm is provided between the chemically prestressed panel and the protective side.

According to DE 2 039 452 A, at a distance of 9.525 mm+0.508 mm to the side of action, the bullet-proof transparent glass/plastic layered unit has a chemically hardened glass panel, and on the side facing away from the side of action, it has a polycarbonate layer with a thickness of 3.175 mm.

Also, DE 200 23 947 U1 describes a similar armored laminated glass panel.

EP 0 884 289 A1 discloses a glass laminate for vehicles, which comprises at least two glass panels with at least one intermediate layer, the outermost individual layer in the laminate being an aluminosilicate glass. This aluminosilicate glass can be chemically prestressed. Due to the use of chemically prestressed aluminosilicate glass, the glass laminate is particularly scratch-resistant and, in contrast to thermally prestressed glass, breaks into large individual pieces when loaded, such as by falling rock, so that in addition, it is possible to see through the glass laminate.

In the publication JP-A-54-100415, a laminated windshield of a vehicle is described, in which the inner panel has a thickness of 1.5 mm or less and is chemically prestressed. This serves for the purpose of reducing head wounds, if passengers on the inside should be hurled against the windshield.

A bulletproof glass panel that has the following layer structure proceeding from the bullet side is known from DE 42 36 233 A1:

at least two glass blocks (I, II), each of which has a first glass panel, a polycarbonate plate and a second glass panel,
at least one other (third) glass block (III), which has a glass panel and at least one polycarbonate plate, which is facing the inner compartment of the vehicle,
in each case, a gas-filled intermediate space is provided between the glass blocks (I, II, III).

A chemically prestressed lithium aluminosilicate glass is known from US 2007/0060465 A1, which has a high resistance to break during bending when impacted by high-speed projectiles, the glass being characterized by a compressive stress in the surface of at least 100,000 psi and a depth of the region of compressive stress of at least 600 micrometers. In the publication, it is assumed that the glass opposes a break due to a resistance that is as high as possible. The arrangement of the glass panel in a laminate is not entered into.

The object of the present invention is to provide a transparent device that achieves a low weight per unit area with sufficient protection and at favorable cost.

The object of the invention is solved in that in the laminate, the surface facing the side of action of a first, chemically prestressed, brittle-fracture panel is disposed at a distance of 6 mm to 20 mm from the side of action, a polymer layer of a thickness between 2 mm and 15 mm being disposed on the surface of the first, chemically prestressed, brittle-fracture panel facing away from the side of action via a polyurethane layer, and a layer of brittle-fracture material being attached to the surface of this polymer layer facing away from the side of action via another polyurethane layer. Thermally or chemically prestressed glass panels have a higher flexural strength when compared with untreated panels, but also have a higher surface hardness and are thus particularly suitable for protective applications. Both types of prestressing lead to a strengthening by way of a compressive stress in a surface layer of the panel, which is compensated by a tensile stress in the core region of the panel. The chemical prestressing of panels is achieved in a process known in and of itself by storing the panels at suitable temperature in a salt bath, so that an ion exchange occurs in the surface of the panels, whereby small ions that serve as network modifiers in the glass are exchanged for larger ones that produce the compressive stress. In this way, the core of the panel recovers under tensile stress. In the case of failure, thermally prestressed panels break into small pieces, for example, into three to five broken pieces per cubic centimeter and are thus not suitable for antiballistic protection. A second or further incoming projectile cannot be stopped, since the material broken into small pieces can only transform a basically reduced fraction of the kinetic energy of the projectile into elastic/plastic deformation energy, heat or cracking energy. Chemically prestressed panels, in contrast, despite high strength, show a coarser fracture pattern and can thus also offer an effective protection against multiple impacts.

In the arrangement according to the invention, the surface of the chemically prestressed, brittle-fracture panel is disposed at a distance of 6 mm to 20 mm behind the side of action of the transparent device, thus the impact surface. In this way, in the case of a hard-core projectile, only its soft jacket is stripped off, and the hard core then reaches the chemically prestressed, brittle-fracture panel. As soon as it penetrates into this panel and reaches the zone of tensile stress in the panel, the panel cracks. In this way, a shock wave arises, which runs perpendicular to the trajectory of the projectile and which propagates in the glass at a speed of 2000 m/s to 5000 m/s. The shock wave is thus essentially faster than the projectile, which moves at approximately 900 m/s. The shock wave exercises a lateral force on the projectile, which may suffice to deflect the projectile or even to break it. In particular, for hard cores of caliber 7.62 mm of high-strength steel grades or tungsten carbide, projectile breaks occur increasingly. This break or a deflection considerably reduces the effective penetration of the hard core. Due to the high velocity of the shock wave, the essentially slower projectile is captured by it in each case.

The region in front of the chemically prestressed, brittle-fracture panel can be composed of a single panel or of a laminate of several panels.

A chemically prestressed, brittle-fracture panel does not have the described effect according to the invention directly on the side of action, since the soft projectile jacket surrounding the hard core attenuates the effect of the shock wave on the projectile.

A particularly advantageous effect with the lowest possible laminate weight is achieved, if the chemically prestressed, brittle-fracture panel according to the invention has a thickness between 3 mm and 15 mm, preferably between 4 mm and 8 mm. In this case, particularly effective lateral forces can be transferred onto the projectile. This is particularly true if the surface of the chemically prestressed, brittle-fracture panel, which is facing the side of action, is disposed at a distance of 6 mm to 20 mm from the side of action.

A particularly cost effective solution can be achieved with materials that have a high chemical prestressing by designing the chemically prestressed, brittle-fracture panels as soda-lime silicate glass panels, aluminosilicate or borosilicate glass panels or as lithium aluminosilicate glass panels or as transparent glass-cermic panels. These materials can be produced in sufficient quantities with the required dimensions of approximately 1 m width and a length of up to 3 m.

The impact of a projectile or fragment triggers a shock wave that travels perpendicularly into the laminate at a higher velocity than the velocity of the projectile and can lead to anticipated damage to the projectile. The projectile is braked less strongly by damaged material than by intact material. One advantageous embodiment provides for reducing the shock wave by replacing a part of the brittle-fracture material by thick polymer layers. The shock wave is braked by its slower propagation velocity in the polymer. In addition, the impedance discontinuity at the brittle-fracture material/polymer interface leads to the formation of a reflected wave, which runs opposite to the incoming shock wave, and in the most favorable case is superimposed in an obliterating manner. It is thus advantageous to provide that a transparent polymer layer with a thickness between 2 mm and 15 mm is disposed via a polyurethane layer on the surface of the first, chemically prestressed, brittle-fracture panel that is not facing the side of action. The polymer layer can comprise polycarbonate, polymethylene methacrylate, as a multiple composite of films of polyvinyl butyral or thermoplastic polyurethanes, in particular also "soft" types, as they are provided for sound decoupling in automobile or architectural applications. According to the prior art, it is provided that intermediate layers of polycarbonate or polymethylene methacrylate are joined to the brittle-fracture panels on both sides with thermoplastic polyurethanes in order to obtain a sufficiently permanent mutual adhesion.

A chemical prestressing of glass panels improves their flexural strength, so that they have a better resistance to impact. If a blunt projectile, such as, for example a fragment, for example a 20 mm "fragment-simulating projectile", impacts the panel pack, it does not penetrate the laminate, but rather acts by way of the entering pulse by guiding the shock wave that arises to detach panel parts on the side facing away from the action. In order to achieve an improved resistance of laminates, it is thus advantageous to improve the flexural strength of the side facing away from the action by disposing another chemically prestressed, brittle-fracture panel having a thickness between 3 mm and 15 mm, which is distanced by way of an intermediate layer, on the surface of the fragment-protection layer that faces the side of action. In this case, the intermediate layer can be formed as a polymer film or as a composite of at least one polymer panel having a thickness of 1.5 mm to 12 mm made of polymer films.

Glass ceramics have a greater hardness and impact resistance as well as a greater toughness relative to cracks and a higher flexural strength than glass. It is thus advantageous for the protective effect if at least one of the brittle-fracture panels of the laminate is designed as a transparent glass-ceramic panel.

A particularly good protective effect of the device is achieved by making the thickness of the panel forming the side of action between 10% and 20% of the total thickness of the brittle-fracture material in the laminate.

After melting, float glass is drawn over a float medium, for example a tin bath, during production, in order to obtain the desired planarity and surface quality. The mechanical strength of the side facing the tin bath, after being evaluated according to a bending tensile test, is thus lower than that of the opposite side. It is thus advantageous for the protective effect, if brittle-fracture panels produced in a float process are oriented by their tin-bath side in the laminate toward the side of action, in order to optimally utilize the elastic strength of the float-glass panels for transforming the kinetic energy of the projectile or the shock wave into elastic deformability.

The invention will be explained in further detail in the following on the basis of examples of embodiment shown in the figures.

FIG. 1 shows schematically, in a not-to-scale representation, a laminate with a side of action 11, onto which a projectile 30 is moving. The side of action 11 is, for example, the outer side of a front or side panel of a motor vehicle. A protective side 21 of the laminate 10 is facing an object to be protected; it is, for example, the inner side of a panel of a motor vehicle. Viewed from the side of action 11, the laminate 10 is composed of a first, e.g., 20 mm thick, glass plate 12, which is joined by means of a first intermediate layer 13 to a chemically prestressed, brittle-fracture panel 14, e.g., of 15 mm thickness, which in turn is joined via a second intermediate layer 15 to a second, e.g. 10-mm thick, glass plate 16. The second glass plate 16 is joined via a third intermediate layer 17 to a third, also 10-mm thick glass plate 18, to which is connected an e.g., 10-mm thick, fragment-protection layer 20 via a fourth intermediate layer 19.

The intermediate layers 13, 15, 17 and 19 are films of polyvinylbutyral or thermoplastic polyurethane, by way of which the components of the laminate 10 have been joined in an autoclaving process. Alternatively, a portion of the intermediate layers 13, 15, 17 or 19 can be designed as casting resin layers. The fragment-protection layer 20 is designed as a polycarbonate panel, so that fragments that arise during the action of the projectile 30 do not strike protective side 21 and thus wounds can be avoided. The chemically prestressed, brittle-fracture panel 14 ensures that, on the one hand, the projectile 30 experiences a lateral loading due to a shock wave in its passage through the chemically prestressed, brittle-fracture panel 14, and is deflected from its path or is damaged. The chemically prestressed, brittle-fracture panel 14 in this way breaks into such large pieces that when further projectiles strike close to the impact site of the projectile 30, the largely intact region of the chemically prestressed, brittle-fracture panel 14 can contribute to the protection.

Figure 2:
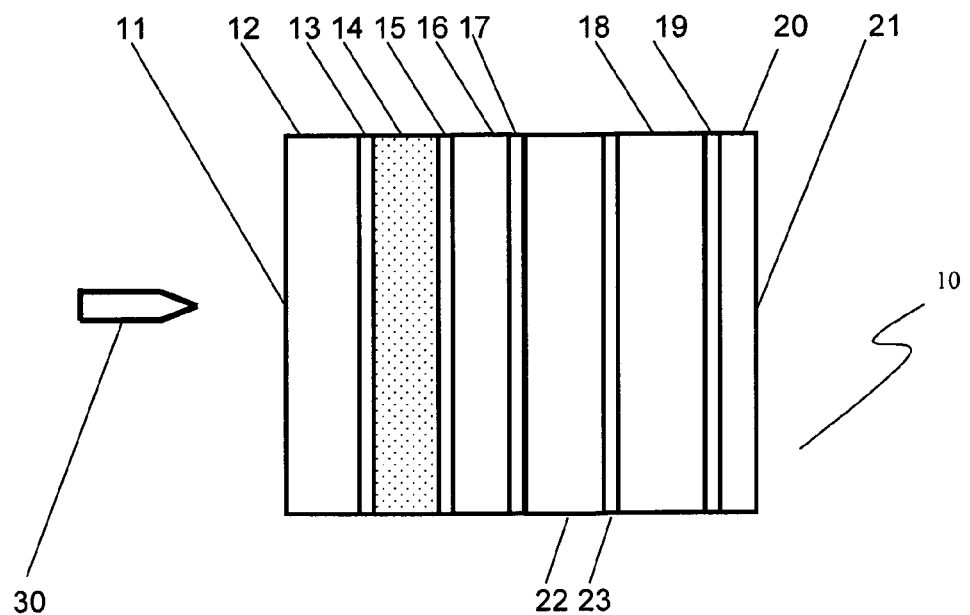

In FIG. 2, components of the at least 60-mm thick laminate 10, which have already been described in FIG. 1, are characterized by the same reference numbers. Subsequently, a polymer plate 22 of 2-15-mm thickness is disposed on the third intermediate layer 17 and this plate is joined to the third glass plate 18 by a fifth intermediate layer 23. The polymer plate 22 can also be disposed according to the invention so that it is connected to the chemically prestressed panel 14 via the second intermediate layer 15.

The invention claimed is:

1. A transparent device for protection from an action of shock, projectiles, fragments or shock waves, comprising:
a laminate having four brittle-fracture, transparent panels that are joined together by transparent intermediate layers, the transparent intermediate layer being formed of casting resin or being formed of polymer film, the laminate having a total thickness of at least 60 mm and the laminate being closed, on a protective side facing away from a side of action, by a fragment-protective layer having a thickness of 0.5 mm to 12 mm, which is formed as a transparent polymer layer, the laminate being closed on a side facing the side of action by one of the four brittle-fracture, transparent panels that comprises a first, chemically prestressed, brittle-fracture panel; and
a polymer layer of a thickness between 2 mm and 15 mm is disposed via a polyurethane layer on a surface of the first, chemically prestressed, brittle-fracture panel that faces away from the side of action.

2. The device according to claim 1, wherein the first, chemically prestressed, brittle-fracture panel has a thickness between 3 mm and 15 mm.

3. The device according to claim 1, wherein the first, chemically prestressed, brittle-fracture panel comprises a glass panel selected from the group consisting of a soda-lime silicate glass panel, aluminosilicate glass panel, a borosilicate glass panel, and a lithium aluminosilicate glass panel.

4. The device according to claim 1, wherein the polymer layer comprises a layer of a material selected from the group consisting of polycarbonate, polymethylmethacrylate, polyethylene terephthalate, and any combination thereof.

5. The device according to claim 1, wherein another of the brittle-fracture, transparent panels has a thickness between 3 mm and 15 mm, is separated by an intermediate layer, which is disposed on the surface of the fragment-protection layer, the intermediate layer being formed as a polymer film or as a composite composed of at least one polymer panel and polymer films, the at least one polymer panel having a thickness of between 1.5 mm and 12 mm.

6. The device according to claim 1, wherein the panel forming the side of action has a thickness that amounts to between 10% and 20% of a total thickness of the brittle-fracture material in the laminate.

7. The device according to claim 1, wherein at least one of the brittle-fracture panels comprises a float processed panel having a side formed by a float medium, the float processed panel being incorporated into the laminate with the float medium side oriented toward the side of action.

8. A transparent device for protection from an action of shock, projectiles, fragments or shock waves, comprising:
a laminate having four brittle-fracture, transparent panels that are joined together by transparent intermediate layers, a fragment-protective layer that closes the laminate on a protective side facing away from a side of action, the fragment-protective layer being a transparent polymer layer, and the laminate being closed on a side facing the side of action by one of the four brittle-fracture, transparent panels that is a first, chemically prestressed, brittle-fracture panel, and a polymer plate disposed on a surface of the first, chemically prestressed, brittle-fracture panel that faces away from the side of action via a polyurethane layer.

9. The device according to claim 8, wherein the transparent intermediate layer is formed of casting resin or is formed of polymer film.

10. The device according to claim 8, wherein the first, chemically prestressed, brittle-fracture panel has a thickness between 3 mm and 15 mm.

11. The device according to claim 8, wherein the first, chemically prestressed, brittle-fracture panel comprises a glass panel selected from the group consisting of a soda-lime silicate glass panel, aluminosilicate glass panel, a borosilicate glass panel, and a lithium aluminosilicate glass panel.

12. The device according to claim 8, wherein the polymer plate comprises a layer of a material selected from the group consisting of polycarbonate, polymethylmethacrylate, polyethylene terephthalate, and any combination thereof.

13. The device according to claim 8, wherein the first, chemically prestressed, brittle-fracture panel has a thickness that amounts to between 10% and 20% of a total thickness of the brittle-fracture material in the laminate.

\* \* \* \* \*